United States Patent [19]

Borri et al.

[11] 3,769,048
[45] Oct. 30, 1973

[54] FRIT COMPOSITION FOR PRODUCING ACID-RESISTANT VITREOUS ENAMELS ON CAST IRON

[75] Inventors: Frank J. Borri, Fords; John T. Lindson, South Amboy, both of N.J.

[73] Assignee: N L Industries, Inc., New York, N.Y.

[22] Filed: Oct. 14, 1970

[21] Appl. No.: 80,751

[52] U.S. Cl.................. 106/49, 106/53, 117/129
[51] Int. Cl....... C03c 5/02, B32b 15/24, C03c 3/10
[58] Field of Search ............... 106/49, 53; 117/129

[56] References Cited
UNITED STATES PATENTS

| | | | |
|---|---|---|---|
| 2,492,523 | 12/1949 | Coffeen et al. | 106/49 |
| 2,507,691 | 5/1950 | Coffeen et al. | 106/49 |
| 3,227,565 | 1/1966 | Tanigawa | 106/53 |

Primary Examiner—A. B. Curtis
Assistant Examiner—Mark Rell
Attorney—Robert L. Lehman, Fred Floersheimer, Harold L. Gammons and Robert L. Holiday

[57] ABSTRACT

Self-opacifying frit compositions for producing vitreous enamels on cast iron are prepared by melting a mixture of various source materials such as the carbonates, nitrates, oxides, fluorides, etc., of the base oxides of groups $R_2O$ and RO, a neutral oxide of group $R_2O_3$, the acid oxides of group $RO_2$, lead oxide and fluorine in specific proportions such that when the molten mixture is quenched a frit composition is produced capable of forming a vitreous enamel coating on cast iron characterized by excellent adherence, white color, high hiding power, uniform gloss and high acid resistance.

5 Claims, No Drawings

FRIT COMPOSITION FOR PRODUCING ACID-RESISTANT VITREOUS ENAMELS ON CAST IRON

BACKGROUND OF THE INVENTION

Many different types of frit compositions have been prepared and used in the vitreous enameling industry for many purposes. Some of the known frit compositions are used to coat ceramic materials while others are used to coat metal products. Among the metal products which are coated are sheet metal, aluminum, various alloys and cast iron. This invention is concerned primarily with the preparation of a frit composition which is useful for forming vitreous enamels on cast iron products.

Prior art processes teach that cast iron has been coated using either a wet or a dry process. In the wet process a frit composition is ground and made into a slip which is subsequently sprayed onto the surface of the metal to be coated and then the coated metal is heated to mature the frit and form a coating of vitreous enamel. In the dry process the metal surface is first sprayed with a thin ground coat, heated and the frit composition sifted or dusted onto the heated surface after which it is again heated to produce the vitreous enamel coating. In general it has been found that vitreous enamels prepared by using the dry process are more durable mand more brilliant than those produced by the wet process.

This invention covers the preparatin of self-opacifying frit compositions useful for coating cast iron products using the dry process. Among the frit compositions known in the art are those in which the opacifying phase has been a compound of antimony, zirconium, tin, an alkaline earth fluoride or titanium dioxide. However these opacifying agents produce coatings having relatively low hiding power or reflectance. Also many of these enamel coatings, and in particular those employing an alkaline earth fluoride as the opacifying phase have not been resistant to acids and hence have had limited use. Moreover the cost of antimony has increased to the point that its use as the opacifying phase in frit compositions is now prohibitive. Another frit composition designed to produce vitreous enamels on cast iron by the dry process is described in U.S. Pat. No. 3,216,847 wherein arsenic is used as the opacifying phase in lieu of antimony or tin. However in view of the toxic nature of arsenic this frit composition has not found favor with the industry.

SUMMARY OF THE INVENTION

The present invention is the discovery of a self-opacifying frit composition capable of producing adherent, acid resistant, white, glossy vitreous enamels on cast iron by the dry process; the frit composition being characterized by a unique combination of the basic, neutral and acid oxides plus lead oxide and the fluorine anion to the exclusion of arsenic or antimony. A fortituous optical phenomenon greatly enhancing the asthetic quality of the enamel produced from this composition is its opacity-in-depth as distinguished from surface-opacity. The latter is commonly identified with the use of $TiO_2$ as the opacifying phase whereas opacity-in-depth has been identified with enamels prepared from frits in which antimony serves as the opacifying phase. The opacifying crystalline phase of the frit compositions of this invention has been identified on the basis of experimental evidence, as comprising a compound or complex composition consisting of a secondary base oxide and the fluorine anion in amounts within the ranges set out below.

In brief the frit composition of this invention comprises: (a) the base oxides of groups $R_2O$ and $RO$, where $R_2O$ identifies the primary or alkali metal oxides such as the oxides of sodium, potassium and lithium and $RO$ identifies the secondary or alkaline earth metal oxides such as the oxides of calcium, magnesium and strontium; (b) lead oxide with or without additional divalent oxides such as zinc oxide and barium oxide; (c) a neutral or $R_2O_3$ group oxide i.e., boron oxide; (d) the acid oxides of group $R_2O$ namely titanium dioxide and silicon dioxide; and (e) the fluorine anion.

PREFERRED EMBODIMENT OF THE INVENTION

In a preferred embodiment of the invention the frit had the following compositions:

WEIGHT PERCENT

| Ingredients | PREFERRED | Minimum | Maximum |
|---|---|---|---|
| $Li_2O$ | 0.0 | 0.0 | 1.58 |
| $Na_2O$ | 12.85 | 11.25 | 14.34 |
| $K_2O$ | 0.0 | 0.0 | 9.47 |
| $MgO$ | 0.0 | 0.0 | 1.67 |
| $CaO$ | 9.30 | 0.0 | 10.88 |
| $SrO$ | 0.0 | 0.0 | 15.90 |
| $BaO$ | 0.0 | 0.0 | 5.7 |
| $PbO$ | 13.20 | 5.76 | 16.72 |
| $ZnO$ | 0.0 | 0.0 | 2.50 |
| $B_2O_3$ | 2.65 | 1.78 | 9.85 |
| $SiO_2$ | 41.60 | 37.76 | 45.50 |
| $TiO_2$ | 13.25 | 9.36 | 16.95 |
| F | 6.10 | 1.84 | 10.17 |
|  | 100.00 |  |  |

As indicated above the preferred frit composition comprises the oxides of sodium, calcium, barium, lead, boron, silicon, titanium and fluorine in the amounts and ranges indicated. It will be understood however that the invention comprehends the substitution, on a mol weight basis, of analogous metals in the respective oxide groups. Thus potassium oxide may replace some of the sodium oxide up to a maximum of about 9.5 weight percent and lithium may replace some of the sodium oxide up to a maximum of about 2.6 weight percent the total amount of mixture of these oxides lying in the range from 11.0 to 15.7 weight percent. Similarly, magnesium oxide, strontium oxide or barium oxide may be substituted in whole or in part for calcium oxide the total amount of the secondary oxides being in the range of from about 7.6 to about 16.0 weight percent. Further a maximum of 3.9 weight percent zinc oxide and 5.7 weight percent barium oxide may be combined with the lead oxide such that the total amount of these oxides is in the range from about 1.0 to 20.0 weight percent. Similarly zirconium oxide may be added in an amount up to about 4.2 weight percent.

The source materials from which the metal oxides are derived are generally well known in the art and comprise the nitrates and carbonates of the metals of the primary and secondary base oxides. Also lead oxide may be derived from litharge or a mono or di lead silicate while a common source material for the neutral oxide i.e., boron oxide is anhydrous borax or boric acid. The acid oxides such as silica may be derived from an alkali metal fluoride such as sodium silico fluoride or potassium silico fluoride while the $TiO_2$ may be a commercial grade of titanium dioxide pigment. The sodium or potassium silico fluoride or calcium or strontium fluoride may also constitute the source material of the fluorine anion used in the frit composition of this invention. No differences were seen in the frit properties starting from different compounds provided equivalent amounts were used.

The frit composition is prepared in the usual manner that is to say the source materials of the respective oxides and the fluorine anion are dry blended to form a uniform mixture which is fed into a furnace or kiln where the mixture is heated to melting temperature to produce a homogeneous fluid mass. The molten mass is then dropped into a body of cold water in which it is cooled rapidly i.e., quenched to form a frit material. This frit material is then recovered, dried, milled and screened to produce a fine powder as a dry coating on cast iron products.

As stated previously, the frit composition of the instant invention is applied to the surface of the cast iron preferably by a dry method. In the experiments which follow cast iron metal test coupons were used measuring 2½ × 5½ × ⅛ inches. The surface of each coupon was coated with a well-known ground coating composition and then heated in a stationary furnace to the melting temperature of the enamel frit composition, usually between 825°C. and 925°C. after which the coupons were removed from the furnace and the finely ground frit composition sifted onto the heated cast iron surface, using as in most commercial application a dredge i.e., a vibrated receptacle having a screen in the bottom thereof. The frit composition immediately melted upon contact with the cast iron. The frit-coated cast iron coupon was then returned to the furnace where it was held for a sufficient length of time to mature the molten frit composition and form a vitreous enamel coating on the cast iron. If it appeared from visual observations that a single application of the frit composition did not suffice to provide the desired opacity the sequence of heating and coating steps were repeated to increase the thickness of the vitreous enamel coating. Upon cooling the latter was found to have a glossy, smooth texture, clean white color, opacity-in-depth, high reflectance value and excellent acid resistance as determined by the A.S.T.M. citric acid test.

In order to describe more fully the instant invention, the following examples are presented to illustrate certain preferred frit composition and method of forming the enamels therefrom. These examples are however not to be considered as limiting the invention to the details therein set forth.

EXAMPLE I

PREPARATION OF FRIT COMPOSITION

The following ingredients were dry blended to form a uniform mixture:

| INGREDIENTS | PARTS BY WEIGHT |
|---|---|
| Sodium nitrate | 9.45 |
| Sodium carbonate | 10.25 |
| Calcium carbonate | 18.7 |
| Barium carbonate | 1.6 |
| Lead mono silicate | 17.6 |
| Anhydrous borax | 4.3 |
| Silica | 41.0 |
| Titanium dioxide | 15.0 |
| Sodium silico fluoride | 11.4 |

The mixture was placed in a fire clay crucible and melted at a glass temperature of about 1,050°C. until the molten mass appeared homogeneous and free flowing. The molten mass was then dumped from the crucible into cold water in which it was quench cooled to form a frit material. The frit material was then removed from the water and dried. It was then dry ground in a ball mill and screened to remove lumps.

The frit composition had the following analysis:

| INGREDIENTS | PERCENT BY WEIGHT |
|---|---|
| $Na_2O$ | 12.85 |
| CaO | 9.30 |
| BaO | 1.05 |
| PbO | 13.20 |
| $B_2O_3$ | 2.65 |
| $SiO_2$ | 41.60 |
| $TiO_2$ | 13.25 |
| F | 6.10 |
| | 100.00 |

Method for Coating Cast Iron

A cast iron coupon was sand blasted to clean the surface. The cleaned metal surface was then sprayed with a slip to form a thin, ground coat having a well-known glossy composition. After drying the ground coat to remove the water the ground coat was only slightly opaque and had the thickness of approximately 3 mls. The ground coated cast iron coupon was then heated in a furnace to 900°C., withdrawn, and the frit composition described above was sifted onto the heated surface of the cast iron coupon where it was melted rapidly. The frit coated coupon was then returned to the furnace and reheated to furnace temperature during which time the frit matured into a vitreous enamel coating on the surface of the cast iron. Upon cooling the enamel coating was smooth and glossy in appearance, possessed a clean white color of high opacity and was hard, durable and resistant to acids. The enamel thickness was approximately 30–60 mls. Reflectance, as determined on a Gardner Color Difference Meter using $L$ values was aobut 85 percent. Acid resistance, as determined by the standard citric acid test method of the Porcelain Enamel Institute, was rated at "AA." These tests are described in detail in Nat. Bureau of Standards Research Paper RP 1345, J. Nat. Bur. Stds. 25, 581,618 (1940) and ASTM Standards 5, 487-491 (1958) respectively.

EXAMPLES 2 – 24

Additional examples of frit compositions prepared in a manner similar to Example I and processed to form corresponding enamels are shown in the Table I below in which both mole percent and weight percent are tabulated. The frit compositions of Examples 2 through 17 were prepared using the same constituents as used in the preferred frit composition supra but in amounts varying from minimum to maximum. And while satisfactory frit compositions have been prepared using minimum amounts of $TiO_2$ and fluorine, frit compositions having somewhat higher amounts of $TiO_2$ and fluorine insure more consistently uniform enamels.

These frits were used to coat cast iron coupons by the method described in Example I. In each case the vitreous enamel coatings were smooth, glossy, hard and durable. Reflectance values were at least 85 percent and the acid resistance ratings were "AA" to "A."

EXAMPLES 18 and 19

In each of these examples frit compositions were prepared as described in Example I except that the strontium ion replaced the calcium ion on a molar basis. Again the vitreous enamels produced were comparable to those of the preceeding examples.

EXAMPLE 20

The frit composition of this example was similar to that of Example I except that the potassium ion partially replaced the sodium ion on a mole basis.

These frit compositions were made into vitreous enamel coatings on cast iron coupons as described above and again the enamels had excellent adherence, optical properties and acid resistance.

EXAMPLE 21

The frit composition of this example was similar to that of Example I except that the lithium ion partially replaced the sodium ion on a mole basis.

EXAMPLE 22

In this example the frit composition of Example I was modified by partially replacing the calcium ion by magnesium ion on a mole basis.

EXAMPLES 23 and 24

Two other frit compositions were prepared similar to that of Example I except that in Example 23, 2.5 weight percent zinc oxide was substituted for part of the lead oxide and in Example 24 a maximum of 5.7 weight percent barium oxide was combined with the lead oxide.

EXAMPLE 25

This example was made to show that zirconium oxide may be added to the frit composition of Example I up to 4.2 weight percent.

The frit compositions described in Examples 21 through 25 were used to coat cast iron coupons in the manner described in Example I above. In every case the vitreous enamel coatings were smooth, glossy and adherent. Reflectance values were at least 85 percent and acid resistance ratings were from "AA" to "A."

TABLE I

FRIT COMPOSITION MOLE PERCENT

| EXAMPLE NO. | 1 | 2 | 3 | 4 |
|---|---|---|---|---|
| $Li_2O$ | — | — | — | — |
| $Na_2O$ | 12.50 | 11.00 | 13.89 | 12.77 |
| $K_2O$ | | | | |
| MgO | | | | |
| CaO | 10.03 | 10.16 | 9.74 | 8.27 |
| SrO | | | | |
| BaO | 0.32 | 0.42 | .42 | .43 |
| PbO | 3.57 | 3.60 | 3.49 | 3.65 |
| ZnO | | | | |
| $B_2O_3$ | 2.30 | 2.31 | 2.35 | 2.25 |
| $SiO_2$ | 41.85 | 42.62 | 40.95 | 42.84 |
| $TiO_2$ | 10.03 | 10.10 | 10.16 | 9.91 |
| F | 19.40 | 19.79 | 19.00 | 19.88 |
| Total | 100.00 | 100.00 | 100.00 | 100.00 |

FRIT COMPOSITION MOLE PERCENT

| EXAMPLE NO. | 5 | 6 | 7 |
|---|---|---|---|
| $Li_2O$ | — | — | — |
| $Na_2O$ | 12.18 | 12.54 | 12.35 |
| $K_2O$ | | | |
| MgO | | | |
| CaO | 11.64 | 10.02 | 9.87 |
| SrO | — | — | — |
| BaO | .42 | — | 1.02 |
| PbO | 3.48 | 3.60 | 3.51 |
| ZnO | | | |
| $B_2O_3$ | 2.34 | 2.28 | 2.36 |
| $SiO_2$ | 40.82 | 41.98 | 41.23 |
| $TiO_2$ | 10.14 | 10.08 | 9.87 |
| F | 18.98 | 19.50 | 19.79 |
| Total | 100.00 | 100.00 | 100.00 |

FRIT COMPOSITION WEIGHT PERCENT

| EXAMPLE NO. | 1 | 2 | 3 | 4 |
|---|---|---|---|---|
| $Li_2O$ | | | | |
| $Na_2O$ | 12.85 | 11.25 (min.) | 14.34 (max.) | 13.05 |
| $K_2O$ | | | | |
| MgO | | | | |
| CaO | 9.30 | 9.45 | 9.12 | 7.65 |
| SrO | | | | |
| BaO | 1.05 | 1.08 | 1.04 | 1.08 |
| PbO | 13.20 | 13.50 | 12.95 | 13.41 |
| ZnO | — | — | — | — |
| $B_2O_3$ | 2.65 | 2.70 | 2.60 | 2.70 |
| $SiO_2$ | 41.60 | 42.30 | 40.90 | 42.40 |
| $TiO_2$ | 13.25 | 13.50 | 13.05 | 13.50 |
| F | 6.10 | 6.22 | 6.00 | 6.21 |
| Total | 100.00 | 100.00 | 100.00 | 100.00 |

FRIT COMPOSITION WEIGHT PERCENT

| EXAMPLE NO. | 5 | 6 | 7 |
|---|---|---|---|
| $Li_2O$ | — | — | — |
| $Na_2O$ | 12.61 | 12.97 | 12.63 |
| $K_2O$ | | | |
| MgO | | | |
| CaO | 10.88 (max.) | 9.35 | 9.16 |
| SrO | — | — | — |
| BaO | 1.04 | 0.0 (min.) | 2.61 |
| PbO | 12.96 | 13.33 | 13.00 |
| ZnO | — | — | — |
| $B_2O_3$ | 2.61 | 2.68 | 2.61 |
| $SiO_2$ | 40.85 | 42.10 | 40.92 |
| $TiO_2$ | 13.05 | 13.40 | 13.06 |
| F | 6.00 | 6.17 | 6.01 |
| Total | 100.00 | 100.00 | 100.00 |

FRIT COMPOSITION MOLE PERCENT

| EXAMPLE NO. | 8 | 9 | 10 | 11 |
|---|---|---|---|---|
| $Li_2O$ | — | — | — | — |
| $Na_2O$ | 12.79 | 12.34 | 12.60 | 11.70 |
| $K_2O$ | | | | |
| MgO | | | | |
| CaO | 10.23 | 9.91 | 10.07 | 9.33 |
| SrO | | | | |
| BaO | .40 | .44 | .42 | .43 |
| PbO | 1.48 | 4.74 | 3.62 | 3.35 |
| ZnO | | | | |
| $B_2O_3$ | 2.33 | 2.24 | 1.51 | 8.59 |
| $SiO_2$ | 42.75 | 41.24 | 42.13 | 39.12 |
| $TiO_2$ | 10.23 | 9.90 | 10.13 | 9.38 |
| F | 19.79 | 19.19 | 19.52 | 18.10 |
| Total | 100.00 | 100.00 | 100.00 | 100.00 |

FRIT COMPOSITION MOLE PERCENT

| EXAMPLE NO. | 12 | 13 | 14 | 15 |
|---|---|---|---|---|
| $Li_2O$ | | | | |
| $Na_2O$ | 13.35 | 11.64 | 12.90 | 12.07 |
| $K_2O$ | | | | |
| MgO | | | | |
| CaO | 10.63 | 9.35 | 10.33 | 9.70 |
| SrO | | | | |
| BaO | .42 | .42 | .42 | .43 |
| PbO | 3.81 | 3.32 | 3.70 | 3.47 |
| ZnO | | | | |
| $B_2O_3$ | 2.48 | 2.17 | 2.39 | 2.20 |
| $SiO_2$ | 37.96 | 45.66 | 43.21 | 40.42 |
| $TiO_2$ | 10.69 | 9.35 | 6.99 | 12.93 |
| F | 20.66 | 18.09 | 20.06 | 18.78 |
| Total | 100.00 | 100.00 | 100.00 | 100.00 |

FRIT COMPOSITION weight PERCENT

| EXAMPLE NO. | 8 | 9 | 10 | 11 |
|---|---|---|---|---|
| $Li_2O$ | | | | |
| $Na_2O$ | 13.92 | 12.27 | 12.93 | 11.90 |
| $K_2O$ | | | | |
| MgO | | | | |
| CaO | 10.10 | 8.90 | 9.37 | 8.60 |
| SrO | | | | |
| BaO | 1.15 | 1.02 | 1.07 | 1.00 |
| PbO | 5.76 (min.) | 16.92 (max.) | 13.30 | 12.20 |
| ZnO | | | | |
| $B_2O_3$ | 2.88 | 2.54 | 1.78 (min.) | 9.85 (max.) |
| $SiO_2$ | 45.18 | 39.80 | 42.00 | 38.50 |
| $TiO_2$ | 14.39 | 12.70 | 13.40 | 12.30 |
| F | 6.62 | 5.85 | 6.15 | 5.65 |
| Total | 100.00 | 100.00 | 100.00 | 100.00 |

FRIT COMPOSITION WEIGHT PERCENT

| EXAMPLE NO. | 12 | 13 | 14 | 15 |
|---|---|---|---|---|
| Li₂O | | | | |
| Na₂O | 13.68 | 11.96 | 13.40 | 12.30 |
| K₂O | | | | |
| MgO | | | | |
| CaO | 9.90 | 8.67 | 9.70 | 8.90 |
| SrO | | | | |
| BaO | 1.13 | .99 | 1.11 | 1.02 |
| PbO | 14.05 | 12.30 | 13.77 | 12.62 |
| ZnO | | | | |
| B₂O₃ | 2.83 | 2.48 | 2.78 | 2.54 |
| SiO₂ | 37.76 (min.) | 45.50 (Max.) | 43.50 | 39.82 |
| TiO₂ | 14.15 | 12.40 | 9.36 (min.) | 16.95 (max.) |
| F | 6.50 | 5.70 | 6.38 | 5.85 |
| Total | 100.00 | 100.00 | 100.00 | 100.00 |

FRIT COMPOSITION
MOLE PERCENT

| EXAMPLE NO. | 16 | 17 | 18 | 19 | 20 |
|---|---|---|---|---|---|
| Li₂O | | | | | |
| Na₂O | 14.43 | 10.92 | 12.72 | 12.50 | 6.30 |
| K₂O | | | | | 6.30 |
| MgO | | | | | |
| CaO | 11.55 | 8.77 | — | — | 9.99 |
| SrO | — | — | 8.10 | 9.96 | — |
| BaO | 0.47 | 0.39 | 0.45 | 0.46 | 0.44 |
| PbO | 4.16 | 3.14 | 3.66 | 3.58 | 3.56 |
| ZnO | | | | | |
| B₂O₃ | 2.68 | 2.04 | 2.38 | 2.28 | 2.31 |
| SiO₂ | 48.60 | 36.48 | 42.66 | 41.72 | 41.76 |
| TiO₂ | 11.61 | 8.77 | 10.22 | 10.03 | 9.99 |
| F | 6.50 | 29.49 | 19.79 | 19.47 | 19.35 |
| Total | 100.00 | 100.00 | 100.00 | 100.00 | 100.00 |

FRIT COMPOSITION
MOLE PERCENT

| EXAMPLE NO. | 21 | 22 | 23 | 24 | 25 |
|---|---|---|---|---|---|
| Li₂O | 3.15 | — | — | — | — |
| Na₂O | 9.38 | 12.48 | 12.50 | 12.46 | 11.74 |
| K₂O | | | | | |
| MgO | | 2.46 | | | |
| CaO | 9.98 | 7.50 | 10.01 | 10.03 | 9.42 |
| SrO | — | — | — | — | — |
| BaO | .42 | .42 | 0.40 | 2.18 | .39 |
| PbO | 3.56 | 3.54 | 1.74 | 1.80 | 2.30 |
| ZnO | — | — | 1.74 | — | — |
| B₂O₃ | 2.31 | 2.34 | 2.26 | 2.30 | 4.32 |
| SiO₂ | 41.81 | 41.85 | 41.96 | 41.80 | 42.00 |
| TiO₂ | 10.04 | 10.02 | 10.00 | 10.03 | 9.45 |
| F | 19.35 | 19.39 | 19.39 | 19.40 | 18.39 |
| Total | 100.00 | 100.00 | 100.00 | 100.00 | |
| ZrO₂ | | | | | 2.04 |
| Total | | | | | 100.00 |

FRIT COMPOSITION
WEIGHT PERCENT

| EXAMPLE NO. | 16 | 17 | 18 | 19 | 20 |
|---|---|---|---|---|---|
| Li₂O | — | — | — | — | — |
| Na₂O | 13.41 | 12.27 | 12.30 | 11.9 | 6.25 |
| K₂O | — | — | — | — | 9.47 (max.) |
| MgO | — | — | — | — | — |
| CaO | 9.71 | 8.90 | — | — | 9.00 |
| SrO | — | — | 13.06 | 15.90 | — |
| BaO | 1.11 | 1.01 | 1.02 | 1.00 | 1.02 |
| PbO | 13.79 | 12.62 | 12.63 | 12.22 | 12.79 |
| ZnO | — | — | — | — | — |
| B₂O₃ | 2.77 | 2.53 | 2.54 | 2.46 | 2.56 |
| SiO₂ | 43.48 | 39.80 | 39.90 | 38.54 | 40.21 |
| TiO₂ | 13.89 | 12.70 | 12.70 | 12.30 | 12.80 |
| F | 1.84 (min.) | 10.17 (max.) | 5.85 | 5.68 | 5.90 |
| Total | 100.00 | 100.00 | 100.00 | 100.00 | |
| ZrO₂ | | | | | |

FRIT COMPOSITION
WEIGHT PERCENT

| EXAMPLE NO. | 21 | 22 | 23 | 24 | 25 |
|---|---|---|---|---|---|
| Li₂O | 1.58 (max.) | — | — | — | — |
| Na₂O | 9.80 | 12.93 | 13.40 | 13.1 | 12.15 |
| K₂O | — | — | — | — | — |
| MgO | — | 1.67 (max.) | — | — | — |
| CaO | 9.45 | 7.03 | 9.70 | 9.5 | 8.8 |
| SrO | — | — | — | — | — |
| BaO | 1.07 | 1.06 | 1.10 | 5.7(max) | 1.0 |
| PbO | 13.40 | 13.28 | 6.88 | 6.72 | 8.4 |
| ZnO | — | — | 2.50 | — | — |
| B₂O₃ | 2.70 | 2.67 | 2.76 | 2.7 | 5.05 |
| SiO₂ | 42.30 | 41.88 | 43.50 | 42.5 | 42.0 |
| TiO₂ | 13.50 | 13.34 | 13.80 | 13.55 | 12.6 |
| F | 6.20 | 6.14 | 6.36 | 6.23 | 5.8 |
| Total | 100.00 | 100.00 | 100.00 | 100.00 | |
| ZrO₂ | | | | | 4.2 |
| Total | | | | | 100.00 |

From the above description and by the examples presented, it has clearly been shown that smooth, glossy white enamel coatings may be formed on cast iron products by the dry process using frit compositions of this invention. The enamels are highly acid resistant, durable and possess high reflectance values.

Since it is obvious that many changes and modifications can be made in the above-described details without departing from the nature and spirit of the invention, it is to be understood that the invention is not to be limited to said details except as set forth in the appended claims.

We claim:

1. A self-opacifying frit composition for forming an adherent, acid-resistant vitreous enamel coating on cast iron having an opacity, as measured by L-value, of at least 85 percent, said frit composition consisting of the following components and concentrations, the latter in terms of percent by weight:

$Li_2O$ — 0.00 – 1.58
$Na_2O$ — 11.25 – 14.34
$K_2O$ — 0.0 – 9.47
$MgO$ — 0.0 – 1.67
$CaO$ — 7.65 – 10.88
$BaO$ — 0.0 – 2.61
$PbO$ — 5.76 – 16.92
$ZnO$ — 0.0 – 2.50
$B_2O_3$ — 1.78 – 9.85
$SiO_2$ — — 37.76 – 45.50
$TiO_2$ — — 12.30 – 16.95
$F$ — 5.65 – 10.17

2. A self-opacifying frit composition for forming an adherent, acid-resistant vitreous enamel coating on cast iron having an opacity, as measured by L-value, of at least 85 percent, said frit composition consisting of the following components and concentrations, the latter in terms of percent by weight:

$Na_2O$ — 11.25 – 14.34
$CaO$ — 7.65 – 10.88
$BaO$ — 0.0 – 2.61
$PbO$ — 5.76 – 16.92
$B_2O_3$ — 1.78 – 9.85
$SiO_2$ — — 37.76 – 45.50
$TiO_2$ — 12.30 – 16.95
$F$ — 5.65 – 10.17

3. An article of manufacture comprisng a cast iron product having an adherent, acid-resistant vitreous enamel coating thereon having an opacity, as measured by L-value of at least 85 percent, said enamel formed from a frit consisting of the following components and concentration, the latter in terms of percent by weights:

$Na_2O$ — 11.25 – 14.34
$CaO$ — 7.65 – 10.88
$BaO$ — 0.0 – 2.61
$PbO$ — 5.76 – 16.92
$B_2O_3$ — 1.78 – 9.85
$SiO_2$ — 37.76 – 45.59
$TiO_2$ — 12.30 – 16.95
$F$ — 5.65 – 10.17

4. A self-opacifying frit composition for forming an adherent, acid-resistant vitreous enamel coating on cast iron said frit having the following composition:

| Ingredients | Percent by Weight |
|---|---|
| $Na_2O$ | 12.85 |
| CaO | 9.30 |
| BaO | 1.05 |
| PbO | 13.20 |
| $B_2O_3$ | 2.65 |
| $SiO_2$ | 41.60 |
| $TiO_2$ | 13.25 |
| F | 6.10 |

5. A self-opacifying frit composition for forming an adherent, acid-resistant vitreous enamel coating on cast iron having an opacity, as measured by L-value of at least 85 percent, said frit composition consisting of the following components and concentrations, the latter in terms of percent by weight:

$Li_2O$ — 0.0 – 1.58
$Na_2O$ — 11.25 – 14.34
$K_2O$ — 0.0 – 9.47
MgO — 0.0 – 1.67
SrO — 13.1 – 15.9
BaO — 0.0 – 2.61
PbO — 5.76 – 16.92
ZnO — 0.0 – 2.50
$B_2O_3$ — 1.78 – 9.85
$SiO_2$ — 37.76 – 45.50
$TiO_2$ — 12.30 – 16.95
F — 5.65 – 10.17

* * * * *